(12) United States Patent
Kim

(10) Patent No.: US 7,364,215 B2
(45) Date of Patent: Apr. 29, 2008

(54) SUNSHADE DEVICE FOR REAR DOOR WINDOW OF AUTOMOBILE

(75) Inventor: Joon-hee Kim, Seoul (KR)

(73) Assignee: Koea Fuel-Tech Corporation, Kyunggi-do (KR)

( * ) Notice: Subject to any disclaimer, the term of this patent is extended or adjusted under 35 U.S.C. 154(b) by 3 days.

(21) Appl. No.: 11/565,035

(22) Filed: Nov. 30, 2006

(65) Prior Publication Data

US 2007/0158970 A1  Jul. 12, 2007

(30) Foreign Application Priority Data

Jan. 6, 2006  (KR)  .................. 10-2006-0001598

(51) Int. Cl.
*B60J 1/20*  (2006.01)
(52) U.S. Cl. ............... 296/97.4; 296/97.8; 160/DIG. 2; 160/DIG. 10; 160/370.22
(58) Field of Classification Search ................ 296/152, 296/97.4, 97.8; 160/238, 265, DIG. 2, DIG. 3, 160/DIG. 10, 370.22, 370.21, 370.23
See application file for complete search history.

(56) References Cited

U.S. PATENT DOCUMENTS

| | | | | |
|---|---|---|---|---|
| 5,033,527 A | * | 7/1991 | Ouvrard et al. | ............. 160/310 |
| 5,468,040 A | * | 11/1995 | Peng Hsieh et al. | ....... 296/97.4 |
| 6,047,762 A | * | 4/2000 | Anderson | .............. 160/370.22 |
| 6,668,902 B2 | | 12/2003 | Bong | |
| 2002/0060470 A1 | * | 5/2002 | Schlecht et al. | ........... 296/97.4 |

FOREIGN PATENT DOCUMENTS

| | | | | |
|---|---|---|---|---|
| DE | 34 15 930 | | 10/1985 | |
| KR | 20-0182090 | | 5/2000 | |
| WO | WO-09425300 A1 | * | 11/1994 | ................ 296/97.8 |

* cited by examiner

*Primary Examiner*—Jason S Morrow
(74) *Attorney, Agent, or Firm*—Michael J. Striker

(57) ABSTRACT

In a sunshade device for the rear door window of an automobile both ends of a sunshade screen rod, to which an end of the sunshade screen wound on the winding roll biased by an elastic member in a frame is fastened, are raised and lowered by a telescopic bar and an actuation arm, which are extended or retracted and erected or tilted through a single driving mechanism assembly including a driving motor, so as to spread or wind the sunshade screen.

2 Claims, 2 Drawing Sheets

SUNSHADE DEVICE FOR REAR DOOR WINDOW OF AUTOMOBILE

BACKGROUND OF THE INVENTION

1. Field of the Invention

The present invention relates to a sunshade device for the ear door window of an automobile, in which a sunshade screen wound on a winding roll is electromotively spread so as to intercept sunlight transmitted through the rear door window of an automobile.

2. Description of the Prior Art

In general, the rear door window of an automobile has a transverse dimension smaller than a longitudinal dimension, unlike a rear windshield. That is to say, the rear door window of an automobile has a width less than its height. Due to this fact, it is difficult to apply such sunshade devices as disclosed in Korean Utility Model Registration No. 182090 and Korean Patent No. 425005 (corresponding to U.S. Pat. No. 6,668,902) to the rear door window of an automobile, each of said sunshade devices having a pair of actuation bars which can be erected or tilted while facing each other to raise or lower a sunshade screen rod, to which one end of the sunshade screen wound on the winding roll disposed in the frame mounted in the widthwise direction of the rear door window of an automobile is fastened.

To date, the sunshade device as disclosed in German Patent aid-open Publication No. DE3415930A1 has been applied to the ear door window of an automobile.

This sunshade device is constructed in a manner such that sunshade screen rod is raised and lowered by two telescopic bars capable of being extended or retracted, as in a well-known antenna assembly, to spread or wind a sunshade screen.

However, since the telescopic bars are relatively slender, when the telescopic bars connected to the sunshade screen rod are extended or retracted, they shake. Specifically, when the rear door window is lowered while an automobile is being driven, the shaking of the telescopic bars becomes more serious, and the sunshade screen flaps.

In the sunshade device, each of the flexible driving cables for extending and retracting the telescopic bars has spur gear teeth, and a driving gear, which comprises a spur gear meshed with the spur gear teeth of the driving cables, is provided to an output shaft to which a worm wheel meshed with a worm secured to the rotation shaft of an electric motor is secured.

As a consequence, because the conventional sunshade device employs a number of gears meshed with one another, a large amount of operation noise is generated, and the structure of the sunshade device is complicated.

Also, due to the fact that the flexible driving cable is movably inserted through a guide tube, the upward and downward movement of the sunshade screen rod is impeded to some extent.

SUMMARY OF THE INVENTION

Accordingly, the present invention has been made keeping in mind the above problems occurring in the prior art, and an object of the present invention is to provide a sunshade device for the rear door window of an automobile, wherein both ends of a sunshade screen rod, to which an end of the sunshade screen wound on the winding roll disposed in a frame is fastened, are simultaneously raised and lowered by a telescopic bar and an actuation arm, which are extended or retracted and erected or tilted using a single driving mechanism assembly, thereby improving the operational reliability of the sunshade device.

In order to achieve the above object, according to the present invention, there is provided a sunshade device suitable for the rear door window of an automobile, comprising a sunshade screen wound on a winding roll which is disposed in a frame and has torsion force applied thereto; a sunshade screen rod having fastened thereto an end of the sunshade screen; a telescopic bar and an actuation arm connected to respective ends of the sunshade screen rod; and a driving mechanism assembly for extending and retracting the telescopic bar and erecting and tilting the actuation arm and for raising and lowering the telescopic bar and the actuation arm.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
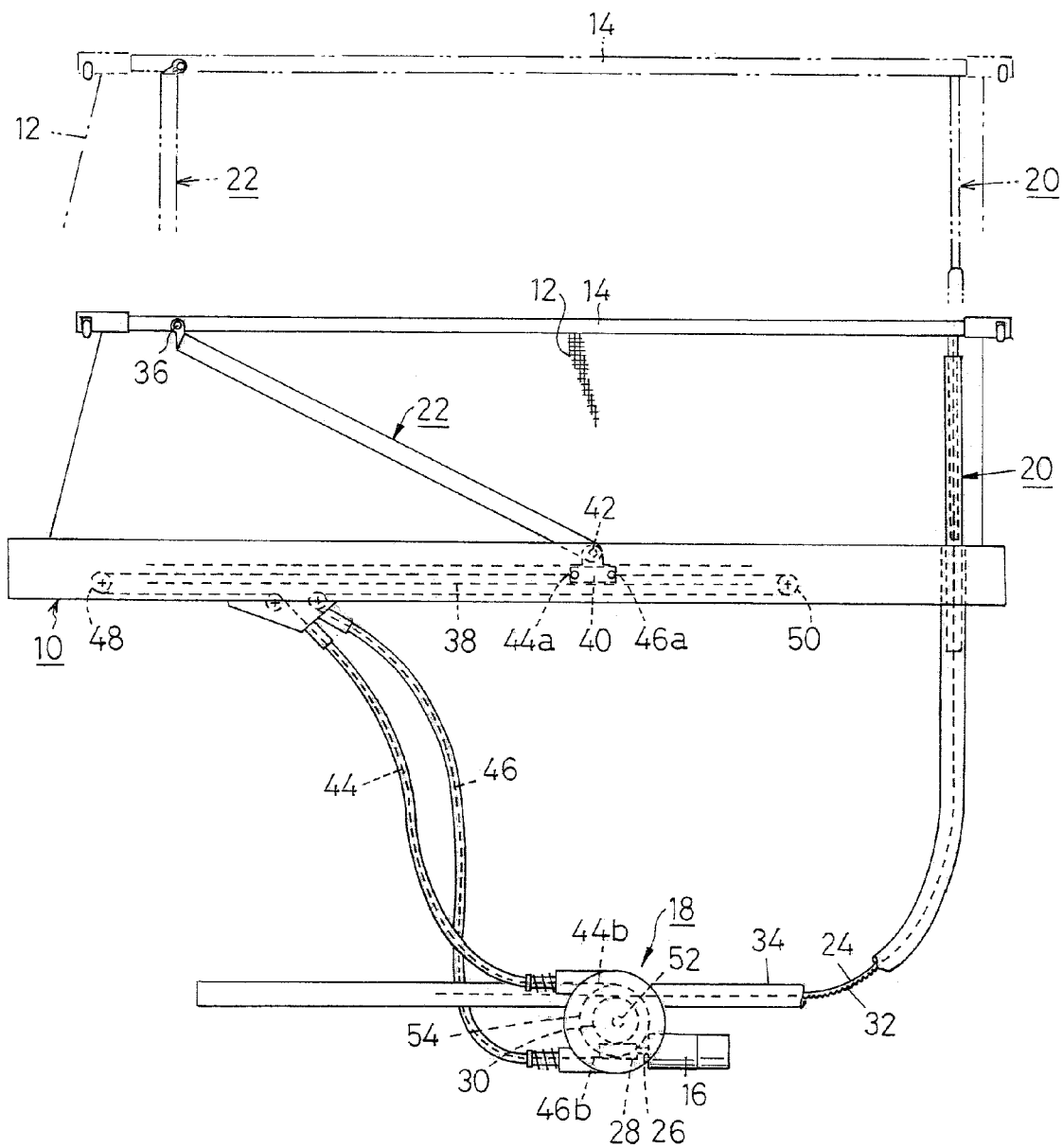
FIG. 1 is a front view illustrating a sunshade device for the rear door window of an automobile in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
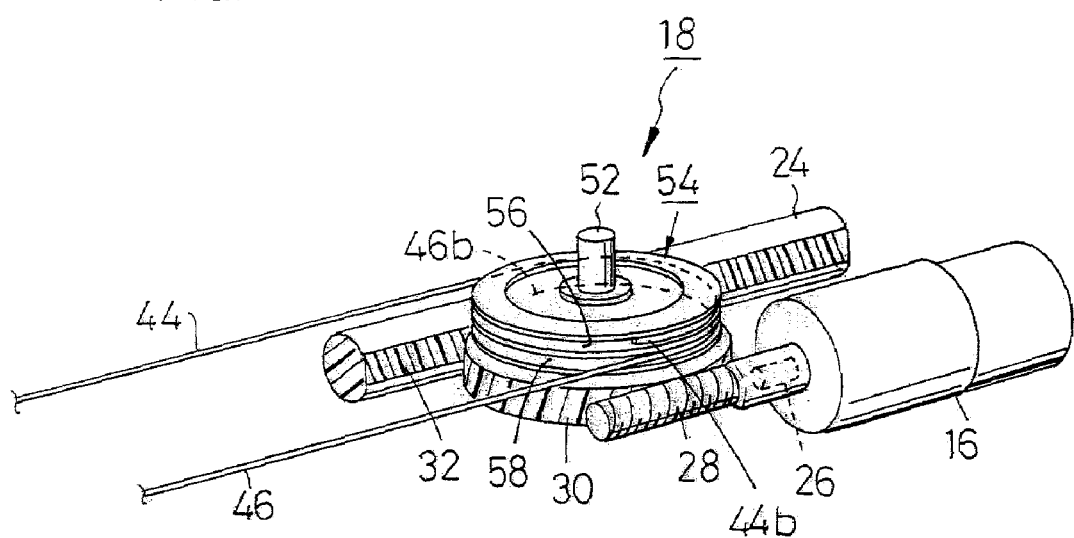
FIG. 2 is a perspective view illustrating the inner structure of the driving mechanism assembly shown in FIG. 1.

Referring to FIGS. 1 and 2, in a sunshade device for a rear door window of an automobile, a sunshade screen rod 14, to which an end of the sunshade screen 12 wound on the winding roll biased by an elastic member, such as a torsional coil spring in a frame 10, not shown in the drawings, is fastened, is raised and lowered by a telescopic bar 20 and an actuation arm 22, which are extended or retracted and erected or tilted through a single driving mechanism assembly 18 including a driving motor 16, so as to spread or wind the sunshade screen 12.

A flexible driving cable 24 for extending or retracting the telescopic bar 20 connected to one end of the sunshade screen rod 14 has formed thereon helical gear teeth 32 which are directly meshed with the worm wheel 30 which in turn is meshed with the worm 28 secured to the rotation shaft 26 of the driving motor 16 in the driving mechanism assembly 18. Due to this fact, the driving cable 24 can be moved in a guide tube 34 using only the worm wheel 30 rotated by the driving motor 16.

The upper end of the actuation arm 22 is pivoted adjacent to the other end of the sunshade screen rod 14 by a pivot pin 36, and the lower end of the actuation arm 22 is pivoted by a pivot pin 42 to a slider 40 which is movably fitted into the guide rail 38 arranged in the frame 10.

First ends 44a and 46a of power transmission cables 44 and 46 are connected to respective ends of the slider 40.

Second ends 44b and 46b of the power transmission cables 44 and 46 are coupled to a cable drum 54 which is secured along with the worm wheel 30 to the output shaft 52 of the driving mechanism assembly 18 after passing through the guide pulleys 48 and 50 disposed in the frame 10, and are wound in the winding grooves 56 and 58 defined in the cable drum 54 in opposite directions. That is to say, the second end 44b of one power transmission cable 44 is coupled to the cable drum 54 and is wound clockwise in one winding groove 56 of the cable drum 54, and the second end 46b of the other power transmission cable 46 is coupled to the cable drum 54 and is wound counterclockwise in the other winding groove 58 of the cable drum 54.

Accordingly, if the output shaft 52 is rotated clockwise by the driving motor 16, as the one power transmission cable 44 is wound in the one winding groove 56 of the cable drum 54 and the other power transmission cable 46 is paid out from the other winding groove 58 of the cable drum 54, the slider 40 is moved leftward, and the actuation arm 22 is erected as shown by two-dot chain lines in FIG. 1. As a result, as the sunshade screen rod 14 is raised, the sunshade screen 12 which is hidden in the frame 10 is spread to the outside.

At the same time, as the flexible driving cable 24, which has the helical gear teeth 32 meshed with the worm wheel 30 secured to the output shaft 52, is moved rightward, the length of the telescopic bar 20 is increased. Therefore, the telescopic bar 20 works in conjunction with the actuation arm 22 to raise the sunshade screen rod 14 and spread the sunshade screen 12 which is hidden in the frame 10.

On the other hand, if the output shaft 52 is rotated counterclockwise by the driving motor 16, as the one power transmission cable 44 is paid out from the one winding groove 56 of the cable drum 54 and the other power transmission cable 46 is wound in the other winding groove 58 of the cable drum 54, the slider 40 is moved rightward, and the actuation arm 22 is tilted. As a result, as the sunshade screen rod 14 is lowered, the spread sunshade screen 12 is wound and retracted into the frame 10.

At the same time, as the flexible driving cable 24, which has the helical gear teeth 32 meshed with the worm wheel 30 secured to the output shaft 52, is moved leftward, the length of the telescopic bar 20 is decreased. Therefore, the telescopic bar 20 cooperates with the actuation arm 22 to lower the sunshade screen rod 14 and wind and retract the spread sunshade screen 12 into the frame 10.

In the present invention, when connecting the telescopic bar 20 and the actuation arm 22 to respective ends of the sunshade screen rod 14, in order to more effectively prevent the sunshade screen 12 from flapping in the wind when a rear door window is opened during driving of an automobile, it is preferred that an actuation arm 22 having a greater strength than the telescopic bar 20 be connected to the rear end of the sunshade screen rod 14, which is influenced more by the wind.

In the present invention, the helical gear teeth 32 formed on the flexible driving cable 24 are directly meshed with the worm wheel 30 which is secured to the output shaft 52 of the driving mechanism assembly 18. Thus, unlike the conventional art, since a driving gear comprising a spur gear which is meshed with the spur gear teeth of a flexible driving cable is not needed, operation noise is decreased, and power transmission efficiency is elevated.

Further, since the actuation arm 22 having a greater strength than the telescopic bar 20 has excellent load carrying capacity, when compared to the conventional sunshade device in which two telescopic bars are connected to both ends of the sunshade screen rod, the operation of the present sunshade device can be quickly and precisely implemented, and the operational reliability of the present sunshade device is improved.

As is apparent from the above description, in the sunshade device for the rear door window of an automobile according to the present invention, both ends of a sunshade screen rod, to which an end of the sunshade screen wound on the winding roll disposed in a frame is fastened, are simultaneously raised and lowered by a telescopic bar and an actuation arm, which are extended or retracted and erected or tilted through a single driving mechanism assembly, to spread or wind the sunshade screen. As a consequence, the sunshade device according to the present invention is suitable for application to the rear door window of an automobile which has a width less than a height thereof. Also, since the operation of the sunshade device is quickly and precisely conducted, the operational reliability of the sunshade device can be improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A sunshade device suitable for a rear door window of an automobile, comprising:
    a sunshade screen which is biased by an elastic member in a frame;
    a sunshade screen rod having fastened thereto an end of the sunshade screen;
    a telescopic bar and an actuation arm connected to a respective ends of the sunshade screen rod; and
    a driving mechanism assembly for extending and retracting the telescopic bar and erecting and tilting the actuation arm and for raising and lowering the telescopic bar and the actuation arm, wherein an upper end of the actuation arm which is connected to the other end of the sunshade screen rod is pivoted by a pivot pin, a lower end of the actuation arm is pivoted by a pivot pin to a slider which is movably fitted into the frame, a cable drum which has winding grooves is secured to an output shaft of the driving mechanism assembly, first ends of power transmission cables are connected to respective ends of the slider, and second ends of the power transmission cables are coupled to the drum and are wound in the winding grooves of the cable drum in opposite directions, so that the actuation arm can be erected or tilted when the output shaft is rotated clockwise or counterclockwise.

2. A sunshade device suitable for a rear door window of an automobile, comprising:
    a sunshade screen which is biased by an elastic member in a frame;
    a sunshade screen rod having fastened thereto an end of the sunshade screen;
    a telescopic bar and an actuation arm connected to a respective ends of the sunshade screen rod; and
    a driving mechanism assembly for extending and retracting the telescopic bar and erecting and tilting the actuation arm and for raising and lowering the telescopic bar and the actuation arm,
    wherein a driving cable of the telescopic bar which is connected to one end of the sunshade screen rod has formed thereon helical gear teeth which are directly meshed with a worm wheel secured to an output shaft rotated by a driving motor in the driving mechanism assembly.

* * * * *